United States Patent
Pawloski

[15] 3,654,700
[45] Apr. 11, 1972

[54] POWERED CUTTING TOOL AND CUTTING HEAD THEREFOR

[72] Inventor: James A. Pawloski, P.O. Box 158, East Woodstock, Conn.

[22] Filed: Aug. 5, 1969

[21] Appl. No.: 847,570

[52] U.S. Cl. ..................................................30/247, 30/228
[51] Int. Cl. ..............................................................B26b 13/04
[58] Field of Search ..........................30/228, 245, 247–251, 30/254, 257, 259, 233

[56] References Cited

UNITED STATES PATENTS

| | | | |
|---|---|---|---|
| 513,542 | 1/1894 | Stockmann | 30/233 |
| 518,129 | 4/1894 | Aufderheide | 30/251 |
| 828,110 | 8/1906 | Hancock | 30/259 |
| 2,264,840 | 12/1941 | Isaac | 30/254 |

Primary Examiner—Theron E. Condon
Assistant Examiner—J. C. Peters
Attorney—Arthur T. Fattibene

[57] ABSTRACT

This disclosure is directed to a powered cutting tool and a cutting head adapted for use therewith comprising a housing for containing a motor means and an actuator for controlling the operation of the motor means. A cutting head is connected in driving relationship with the motor means. The cutting head includes a pair of relatively movable jaws having a by-pass disposed in substantial alignment with the shear line of the jaws so as to prohibit curling of the material or binding of the tool during a cutting operation.

3 Claims, 9 Drawing Figures

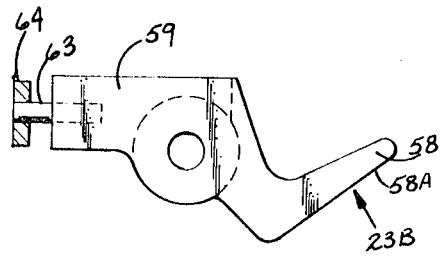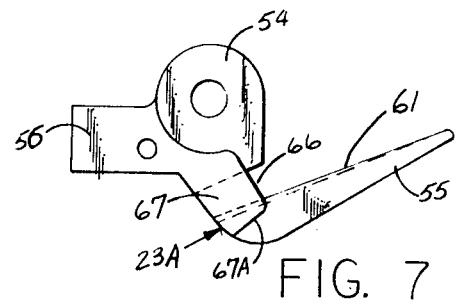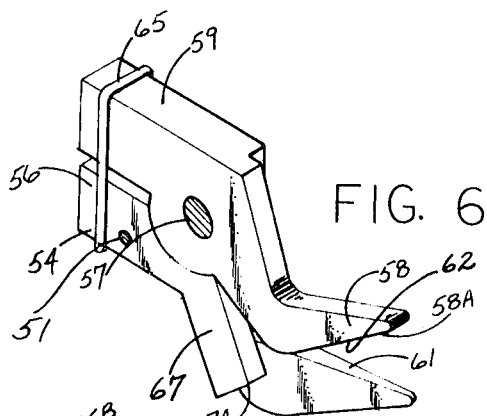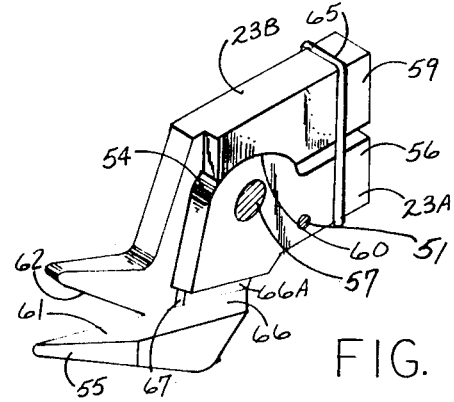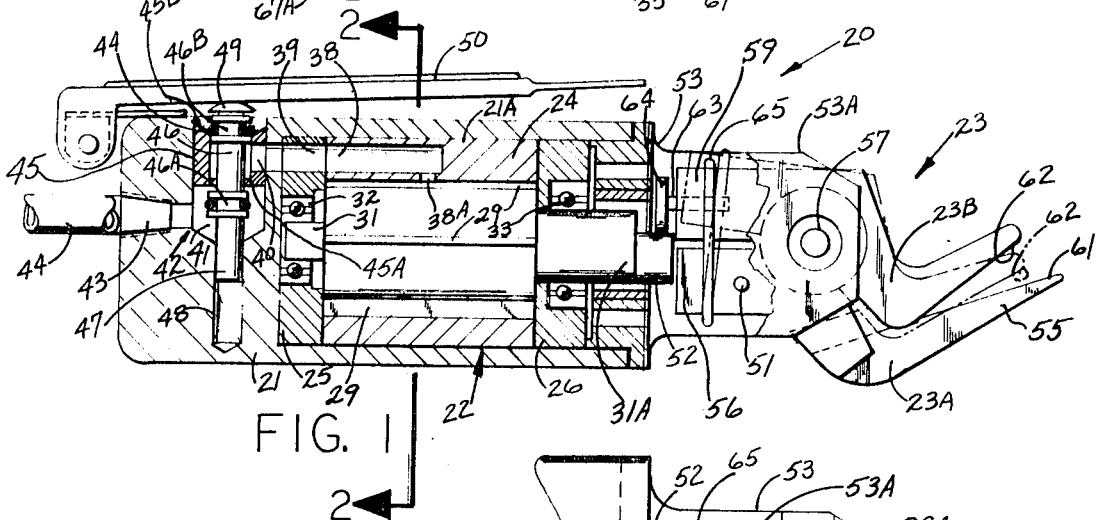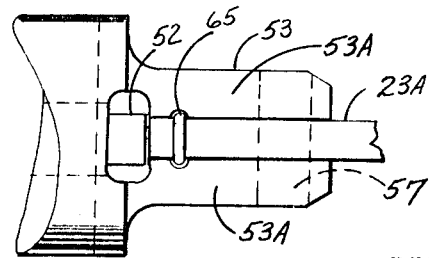
INVENTOR.
JAMES A PAWLOSKI
ATTORNEY

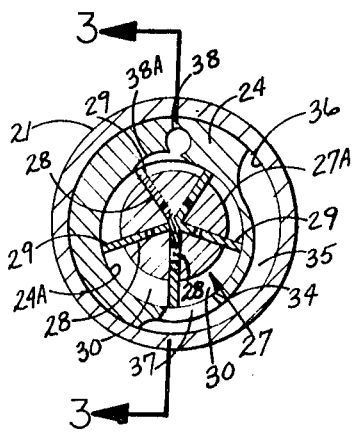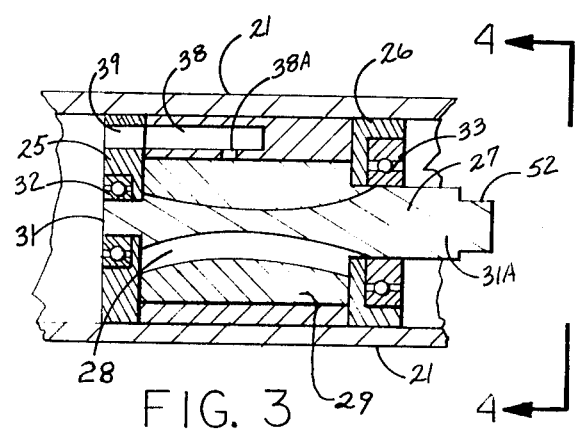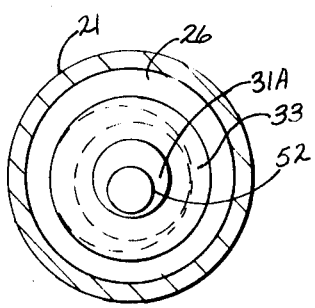

POWERED CUTTING TOOL AND CUTTING HEAD THEREFOR

PROBLEM IN THE ART

Heretofore in cutting sheet material with a scissor or similar tool, e.g., sheet metal, plastic, cardboard, or other like material of any thickness or rigidity, considerable difficulty had been encountered in initiating the cut and in prohibiting the severed portions from curling as the tool is guided through the cut of the material. Also with the known scissor type cutters the tool had to be worked around the material being cut when intricately shaped patterns were required to be formed. Frequently, the material would interfere with the cutting operation and thereby prohibit certain close and intricate patterns or shapes from being formed. When the tool or scissor was required to be worked around the material it frequently was difficult to form a cut with a sharp right angle edge. This difficulty is aggrevated as the thickness of the material is increased. That is, with thicker materials, the cut or severed edge of the material was often formed with an undesirable angled or beveled edge. Also as the thickness of the material increased the jaws of the known cutters or scissors would encounter considerable resistance in making the cut. This was due to the necessity of requiring severed portions of the material to spread as the scissors was worked through the material. Thus as the thickness of the material increased, the ability of the material to spread decreased causing the resistance to the tool to increase. Consequently with power driven cutters considerable power requirements were necessary to work a cutter through a sheet of material of any substantial thickness. Where the thickness of the material was excessive the jaws of the cutters would also tend to bind on initiating the cut unless and/or until the severed portion of the material was spread an amount sufficient to permit the back of the jaws to pass through.

OBJECTS

It is an object of this invention to provide a cutting tool having an improved cutting head which permits the cutting of a sheet material to be performed without causing the severed portion of the material to curl.

Another object is to provide a cutting tool having a cutting head in which binding is prohibited during the initiation of a cut and/or during a cutting operation.

Another object is to provide a cutting tool with a cutting head which can readily guide through the material being cut with a maximum of ease.

Another object is to provide a cutting tool which can be readily guided through a sheet of material to form intricate designs and/or shapes with a maximum of ease and a minimum of effort.

Another object is to provide an improved cutting head for scissor type cutting tools which will enable the jaws to cut through thicker material without increasing the power requirement.

Another object is to provide an improved cutting head for scissor type cutters which is constructed and arranged so as to minimize the resistance of the material thereto during a cutting operation.

Another object is to provide an improved cutting head for scissor type cutting tools in which the cutting head under similar operating conditions can cut through material of greater thickness than was heretofore possible.

Another object is to provide an improved cutting tool which is relatively simple in construction, relatively inexpensive to manufacture, and which is positive in operation.

BRIEF SUMMARY OF THE INVENTION

The foregoing objects and other features of the invention are attained by a tool comprising a housing in which there is disposed a motor means and an actuating means for controlling the operation of the motor means. Operatively connected in driving relationship to the motor means is a cutting head which includes a pair of relatively movable jaw members in which at least one jaw member is mounted for movement relative to the other. Means are provided for normally biasing the jaw means toward closed position.

The jaw members are particularly constructed so as to include a by-pass for the severed portion of the material to prevent binding and/or curling of the material during a cutting operation. The by-pass is defined as a channelway formed in the side portion of one of the jaw means which is co-planarly disposed along the shear line defined between the complementary shear edges of the respective jaw members. The arrangement of the jaw members is such that the shear edge of one is always above the plane of the sheet material being cut. Means are also provided for limiting the relative opening and closing distances of the respective jaw members to provide for maximum safety.

FEATURES

A feature of this invention resides in the provision of an improved jaw construction for use as a scissor type tool which will prohibit the material being cut from curling as the jaw construction cuts its way through a sheet material.

Another feature of the invention resides in the provision of a powered cutter which is safe and which is readily adapted for cutting various types of sheet material with equal facility.

Another feature resides in the provision of a pair of cutting jaws having a by-pass disposed in alignment with the shear line of the tool so as to facilitate the passage of the jaws through the material during a cutting operation.

Another feature resides in the provision of an improved cutting tool capable of cutting through a thicker sheet material without increased power requirements.

Another feature resides in the provision of a tool having cutting jaws arranged so as to avoid interference with the cut material as the jaws can be guided through the cut being made without necessitating the spread of the severed material heretofore required to permit the passage of the cutting jaws therethrough.

Other features and advantages will become more readily apparent in view of the drawings and specifications in which:

In the drawings:

FIG. 1 is a sectional side view illustrating the cutting tool of this invention and the cutting head adapted for use herewith.

FIG. 2 is a sectional view taken along line 2—2 on FIG. 1.

FIG. 3 is a sectional view taken along 3—3 on FIG. 2.

FIG. 4 is a right end view of FIG. 3 looking in the direction of line 4—4.

FIG. 5 is a perspective view of the cutting head jaws.

FIG. 6 is a perspective view of the cutting head jaws illustrating the other side thereof.

FIG. 7 is a detail side view of one of the jaw members of FIGS. 5 and 6.

FIG. 8 is a detail side view of the other jaw member of FIGS. 5 and 6.

FIG. 9 is a detail bottom plan view of the jaw housing of FIG. 1.

Referring to the drawings, there is shown in FIG. 1 a sectional view of a powered cutting tool 20 embodying the present invention. The tool 20 comprises a tubular housing 21 having a longitudinally extending bore 21A opening to one end thereof. Disposed within the bore 21A is a drive means or motor means 22 for effecting the actuation of the cutting head 23 as will be hereinafter described.

In the illustrated form of the invention the drive or motor means 22 comprises a fluid actuated motor which is adapted to be activated as, for example, by compressed air. The air motor or drive means comprises a stator 24 which is fixed within the bore 21A of housing 21 between a pair of end bearing plates 25 and 26.

As best seen in FIG. 2 the stator 24 is provided with an eccentrically disposed bore 24A extending therethrough and a rotor 27 is rotatably journalled within the stator bore 24A.

The rotor body 27A is arranged so as to be eccentrically disposed with respect to the bore 24A of the stator. The body 27A of the rotor 27 is provided with a plurality of circumferentially spaced, longitudinally extending slots 28 for slidably receiving a vane 29. In the illustrated form of the invention the respective vanes 29 are free to move radially within their respective slots when subjected to centrifugal force as the rotor rotates.

As seen in FIG. 2 the outer edges of the respective vanes 29 are disposed in sealing contact with the internal surface of the stator bore 24A so as to define a plurality of expansible chambers 30 which are caused to expand and contract as the rotor rotates as evident in FIG. 2. The rotor body 27A is provided with projecting end portions 31, 31A which are journalled in end bearing 32, 33 carried in end plates 25 and 26.

Referring to FIG. 2, a circumferential portion 34 of the stator 24 is scalloped or cut away to define an exhaust chamber 35 between the scalloped portion 34 of the stator 24 and the internal surface 36 of the tool housing 21. The exhaust chamber 35 in turn is connected in communication through a series of slotted openings 37 formed in the stator housing with the respective expansible chambers 30 defined between adjacent vanes as the rotor 27 rotates. Disposed in the top or thicker portion of the stator 24 is a passageway 38 disposed in communication with an opening 39 formed in end plate 25 to connect the passageway with the outlet 40 of a valve chamber 41. Accordingly rotation of the rotor 27 is effected by the flow of compressed air entering through passageway 38 and exhausting into the adjacent expansible chamber through inlet 38A. The air in expanding through the stator housing effects rotation of the rotor. The expanded air is then exhausted through slotted openings 37 as the respective chambers 30 rotate thereby. The driving fluid is finally exhausted from the tool to the atmosphere through an appropriate opening formed in the front end of the housing, which is in communication with the exhaust chamber 35.

In the illustrated embodiment the flow of air through the air motor 22 is such that the rotor 27 is rotated in a clockwise direction as viewed in FIG. 2.

Means are provided for controlling the flow of actuating fluid to the air motor 22. The control means comprises a valve assembly 42 formed in the rear end of the housing 21. The valve assembly 42 includes a valve chamber 41 formed in the rear of the housing so as to be in communication with a fluid inlet 43 which is adapted to detachably connect with the end coupling of an air supply hose 44. A valve sleeve 45 is fixedly secured within the valve chamber 41. As shown the valve sleeve 45 is formed with an opposed axially aligned valve seats 45A, 45B at its respective ends.

A spool valve 46 having opposed valve heads 46A, 46B is reciprocally mounted within the valve sleeve 45 so that the respective valve head 46A, 46B will valve one or the other of the complementary valve seats 45A, 45B respectively. As shown the lower end of the valve spool 46 is provided with an extension 47 adapted to be received in a counterbore 48 to function as a means for guiding the valve spool and for maintaining the alignment of the valve heads 46A, 46B with the respective valve seats 45A, 45B during its actuation. The upper end of the valve spool is provided with an upper extension 49 which extends beyond the housing 21. Pivotally mounted to the end of the housing 21 is an actuating lever 50 arranged to extend over and adapted to engage with the upper extension 49 of the spool valve.

As best seen in FIG. 1 the center line of the lower valve head 46A is arranged so as to be normally disposed above the center line of the fluid inlet 43 to the valve chamber 41. Thus whenever an air pressure line 44 is connected to the tool inlet 43, the line pressure acting on the lower valve head 46A will tend to maintain the lower valve head 46A in seating or valve closed position against the lower valve seat 45A. Thus with the pressure line 44 attached to the tool, the valve 46 functions as a normally closed valve due to the pressure of the fluid acting thereon. The outlet 40 of the valve chamber is thus sealed against the flow of air and the flow of air is prohibited from passing to the motor through the fluid passageway until the actuating lever 50 is depressed to open valve seat 45A and close valve seat 45B.

Accordingly, to effect operation of the air motor 22, the actuating lever is required to be depressed to unseat the lower valve head 46A to open position and seating the upper valve head 46B to close position whereby air pressure or flow is directed through valve chamber 41, past the open valve seat 45A to the valve outlet 40 and thence through passageway 39 and 38 to the motor chamber thereby causing the rotor to operate.

Connected to the front bearing end 31A of the rotor there is provided an eccentric cam 52 arranged to operate on the cutting jaws 23. As best seen in FIG. 1 a jaw housing 53 is preferably detachably connected to the open front end of the tool housing 21, as for example, by a suitable threaded, bayonet or pin type connection. The jaw housing 53 comprises a bifurcated head end portion 53A between which there are connected a pair of complementary cutting jaws 23A, 23B. The jaws 23 are connected between the bifurcates 53A of the jaw housing 53 so as to be relatively movable.

In the illustrated embodiment jaw member 23A is provided with a nose portion 55 and a connected complementary arm portion 56. Intermediate the jaw members there is provided a bearing portion 54. The jaw member 23A is secured between the bifurcates 53A of the jaw housing 53 by means of a pivot pin 57 which extends through the bearing portion 54. Jaw member 23A is preferably fixedly secured between the bifurcates 53A of the jaw housing by a pin 51 extending through the bifurcates 53A and the arm portion 56 of jaw member 23A.

Jaw member 23B is also provided with a nose portion 58 which complements the nose portion 55 of jaw 23A, and an arm portion 59 disposed to overly the arm 56 of jaw member 23A. Jaw member 23B is also provided with a complementary bearing portion 60 adapted to mate with bearing portion 54 of jaw member 23A. As shown the complementary bearing portions 54 and 60 are generally arcuate to define a portion of a circle which enables the respective jaws to have limited relative movement during a cutting operation. In the illustrated form bearing portion 60 is defined as an undercut in arm 59 and bearing portion 54 is formed as a complementary undercut in arm 56. As shown in FIGS. 1, 5–8, the jaw member 23B is pivotally mounted for movement relative to the fixed jaw member 23A by means of pivot pin 57.

The arrangement of the jaw members 23A, 23B is such that the respective arms 56, 59 are co-planar disposed so as to be sandwiched between the bifurcates 53A of the jaw housing 53. With the jaws mounted as shown in FIGS. 1, 5 and 6, the nose 55 of the lower jaw member 23A is angularly disposed relative to the nose 58 of the upper jaw 23B to define therebetween an accute angle. Thus the upper edge 61 which defines the cutting edge of jaw member 23A cooperates with the lower edge 62 of jaw 23B to define a shear line along which a sheet material is cut or severed during a cutting operation.

In the illustrated embodiment the jaw member 23B is disposed in driving relation with the motor means 22. The driving connection is attained by pin or shaft 63 extending to the rear of the arm 59 of jaw member 23B, and a roller cam follower 64 is rotatably journalled to the free end pin 63, as shown in FIG. 1. The roller cam follower 64 in turn is disposed in engaging relation with the eccentric cam 52 connected to the front bearing end 31A of the rotor. An endless elastic cord or band 65 encircles the complementary arm portions 56, 56 of the respective jaw members 23A, 22B to normally maintain or bias the cam follower 64 in rolling contact with the eccentric cam 52. It will then be noted that as the rotor is actuated the eccentric cam will travel in an elliptical path causing the cam follower 64 to effect displacement of the movable jaw 23B an amount indicated in FIG. 1 as depicted by the solid line and dotted line showing of jaw 23B. The relative reciprocation occurring between the respective nose portions of the cutting jaws will result in a shearing or cutting action when a piece of sheet material is disposed in the opening or angle defined between the complementary jaws 23A, 23B.

To prevent binding of the jaws during a cutting operation and/or to prevent the curling of the severed material during a cutting operation, a means is formed in the jaws to define a by-pass 66 for the material so as to decrease or minimize the resistance of the material to the tool during the cutting operation. As best seen in FIGS. 1 and 5 to 8, the jaw member 23A has formed along the outside thereof a channel or by-pass 66. The channel or by-pass 66 is disposed immediately above the cutting edge 61 and extends so as to be disposed in co-planar relationship to the shear line defined between the complementary jaw members 23A, 23B. As shown the by-pass or channel 66 extends the distance or width of the portion 67 connecting the nose portion 55 to the arm portion 56. As shown the base or bottom 66A of the channelway or by-pass 66 is at least co-planarly disposed with the shear line of the jaws. Referring to FIGS. 5 and 7 the nose portion 55 is connected to the arm portion 56 by a boss or thickened portion 67, the lower edge 67A terminating so as to be in substantial alignment with the lower, shear edge 62 of jaw member 23B.

With the construction described the respective arm 56, 59 and complemental bearing portions 54 and 60 are disposed in a common plane having a predetermined thickness adapted to be received within the space defined between bifurcates 53A of the jaw housing. The thickness of the respective nose portions 55 and 58 are each approximately half the thickness of their respective arm portions 56, 59. Thus as will be observed during a cutting operation the shear edge 62 of jaw member 23B is disposed generally above the sheet material to be cut whereas the cutting edge 61 of the lower jaw 23A is disposed below the sheet material. Actuation of the motor means 22 effects relative reciprocation of the jaw member 23B so that a sheet material disposed between the jaws is cut along the shear line of the jaw members 23A, 23B. Because of channelway 66, the severed portion of the material on one side of the cut line is free to pass therethrough as the tool is advanced along a cut line in the material. The other severed portion on the opposite side of the cut is directed under the edge 67A of boss 67.

With the construction of the jaws described, the severed or cut portions of the sheet material are not required to spread apart along the cut line so as to enable the back portion of the jaws to pass therethrough. Consequently the resistance heretofore encountered in a material to the tool during a cutting operation is substantially minimized thus permitting the described tool to cut through thicker piece material with comparable power input. Another result attributed to the described jaws is that because of their construction, the severed portions of the sheet material are maintained free from curling as the severed material does not result in a resistance to the movement of the tool therethrough during a cutting operation. The feature of the jaws 23 which enables this is that the shear line or cutting line of the cooperating jaws do not terminate at a thickened rear part of the jaws. Thus the tool or jaws can be guided through a sheet of material being cut without requiring the material to be spread apart so as to provide clearance for the back portions of the jaws to pass therethrough as wit convention scissor jaws. The angle of the jaws and the relative positions of the channelway 66 and boss edge 67A is such that the jaws can be guided along a cutting line without causing the cutting line to be spread or opened for the remaining portion of the tool to follow. Consequently the described tool enables a cutting operation to be accomplished with greater ease and facility. Also the tool is not required to be "worked" relative to the material. Because of the ease in guiding the tool through the material the tool is capable of cutting more intricate designs in sheet material, and more important can be used to cut through thicker sheets of material without added power input. The relative movement of the jaw during a cutting operation need not be great. In the illustrated arrangement, as best seen in FIG. 1, the end portions of the jaws never really close. This enables the tool to be used with maximum safety as it is virtually impossible for an operator to cut himself. By maintaining one jaw fixed, e.g., jaw 23A, guidance of the tool is facilitated. Also the air motor enables the tool to operate at high cutting speeds, e.g., 16,000 revolutions per minute. The jaws are also constructed so that there is virtually no wear on the jaw. The jaw construction avoids interference with the cut or severed material thereby prohibiting binding of the tool as the jaws can be guided through the cut or slit formed in the material.

While the jaw construction is described as being actuated by a fluid motor, it will be understood that the jaw construction may be used in a manually operated tool, or in a tool powered by other drive means, e.g., an electric motor, hydraulic motor and the like. Thus as the invention has been described with respect to a particular embodiment, it will be understood that variations and modifications may be made without departing from the spirit or scope of the invention.

I claim:
1. A cutting tool having a pair of cutting jaws mounted for relative movement to effect a cutting operation on a piece of material disposed therebetween and said jaws having overlapping shear edges to effect a shearing action on a material during a cutting operation, the improvement of:
   each of said jaws including a nose portion defining a shearing edge arranged to be disposed in overlapping side by side relationship to define a shear line therebetween,
   a connected arm portion to each of said jaws,
   a means disposed between said nose portion and connected arm portion for pivotally connecting said jaws for relative movement,
   a channelway formed in the side of one of said jaws,
   said channelway including the shear edge of said one jaw,
   each of said jaws having a complementary bearing portion,
   means for reinforcing said one jaw in the vicinity of said channelway,
   said latter reinforcing means including a boss having a lower edge portion disposed in alignment with the shear edge of the other jaw,
   and means circumscribing said arm portion for normally biasing said jaws toward closed position.
2. The invention as defined in claim 1 and including a bifurcated jaw housing for supporting said jaws,
   and means for fixedly securing said one jaw to said housing.
3. The invention as defined in claim 1 wherein said biasing means includes an endless elastic band circumscribing said arm portion of said jaws.

* * * * *